US011770513B1

(12) United States Patent
Valli et al.

(10) Patent No.: US 11,770,513 B1
(45) Date of Patent: Sep. 26, 2023

(54) SYSTEMS AND METHODS FOR REDUCING A NUMBER OF FOCAL PLANES USED TO DISPLAY THREE-DIMENSIONAL OBJECTS

(71) Applicant: Rovi Guides, Inc., San Jose, CA (US)

(72) Inventors: Seppo Valli, Espoo (FI); Pekka Siltanen, Helsinki (FI)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/863,793

(22) Filed: Jul. 13, 2022

(51) Int. Cl.
*H04N 13/133* (2018.01)
*H04N 13/332* (2018.01)
*H04N 13/128* (2018.01)

(52) U.S. Cl.
CPC ......... *H04N 13/133* (2018.05); *H04N 13/332* (2018.05); *H04N 13/128* (2018.05)

(58) Field of Classification Search
CPC ... H04N 13/133; H04N 13/332; H04N 13/128
See application file for complete search history.

(56) References Cited

U.S. PATENT DOCUMENTS

| 9,445,002 | B2* | 9/2016 | Nakajima | H04N 23/67 |
| 10,088,685 | B1* | 10/2018 | Aharoni | G02B 6/0076 |
| 10,520,735 | B1* | 12/2019 | Aharoni | G02F 1/133621 |
| 11,209,651 | B2* | 12/2021 | Welch | G02B 27/0172 |
| 11,610,378 | B1* | 3/2023 | Nevins | G06T 7/70 |
| 2009/0315884 | A1* | 12/2009 | Lee | H04N 13/341 |
| | | | | 345/545 |
| 2013/0243305 | A1* | 9/2013 | Chiu | H04N 13/341 |
| | | | | 382/154 |
| 2014/0125652 | A1* | 5/2014 | Raju | H04N 13/128 |
| | | | | 345/419 |
| 2015/0178980 | A1* | 6/2015 | Bublitz | G02B 21/365 |
| | | | | 345/419 |
| 2016/0191905 | A1* | 6/2016 | Robinson | H04N 23/70 |
| | | | | 348/46 |
| 2017/0154464 | A1* | 6/2017 | Lanier | G02B 27/1006 |
| 2017/0270662 | A1* | 9/2017 | Kato | H04N 23/56 |
| 2017/0329143 | A1* | 11/2017 | Svarichevsky | G02B 27/0103 |

(Continued)

OTHER PUBLICATIONS

Akeley, K. et al., "A Stereo Display Prototype with Multiple Focal Distances," ACM Trans. Graph. 23, 3, 804-813 (2004.

(Continued)

*Primary Examiner* — Dmitriy Bolotin
(74) *Attorney, Agent, or Firm* — HALEY GUILIANO LLP

(57) ABSTRACT

Systems and methods for reducing a number of focal planes used to display a three-dimensional object are disclosed herein. In an embodiment, data defining a three-dimensional image according to a first plurality of focal planes are received. Pixel luminance values from the first plurality of focal planes are mapped to a second plurality of focal planes comprising fewer focal planes than the first plurality of focal planes. Data is stored identifying initial focal distances of the mapped pixel luminance values in the first plurality of focal planes. The second plurality of focal planes are then displayed on a near eye device which uses the data identifying initial focal distances of the mapped pixel luminance values to adjust a wavelength of light produced by the second plurality of images to cause the pixels to appear at their original focal distances.

18 Claims, 11 Drawing Sheets

(56) References Cited

U.S. PATENT DOCUMENTS

2019/0289276 A1* 9/2019 Falstrup ............. G06F 3/04812
2021/0235067 A1* 7/2021 Valli .................... H04N 13/366
2022/0070427 A1* 3/2022 Ha ....................... H04N 13/376

OTHER PUBLICATIONS

Cui, W. et al., "Optical Mapping Near-eye Three-dimensional Display with Correct Focus Cues," Optics Letters 42:2475-8 (2017).
Hillaire, S. et al., "Using an Eye-Tracking System to Improve Camera Motions and Depth-of-Field Blur Effects in Virtual Environments," IEEE Virtual Reality, pp. 47-50 (2008).
Hua, H., "Enabling Focus Cues in Head-Mounted Displays," Imaging and Applied Optics 2017, OSA Technical Digest.
Kramida, G. et al., "Resolving the Vergence-Accommodation Conflict in head-Mounted Displays", IEEE Trans. Vis. Comput. Graph., vol. 22, No. 7, pp. 1912-1931 (2016).
Liu, S. et al., Time-multiplexed dual-focal plane head-mounted display with a liquid lens, Optics Letters, 34(11):1642-4, (2009).
Liu, S. et al., "A Novel Prototype for an Optical See-Through Head-Mounted Display with Addressable Focus Cues," IEEE Trans. Vis. Comput. Graph., vol. 16, No. 3, pp. 381-393 (2010).
Matsuda, N. et al., "Focal Surface Displays," ACM Trans. Graph. 36,4, 1-14 (2017).
Rolland, J., et al., "Multifocal Planes Head-Mounted Displays," Applied Optics 39(19): 3209-15 (2000).
Zhan, T. et al., "Multifocal displays: review and prospect," PhotoniX, 1:10 (2020).

* cited by examiner

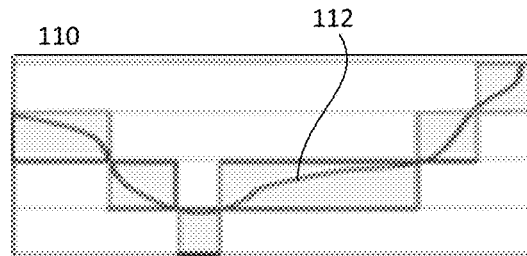
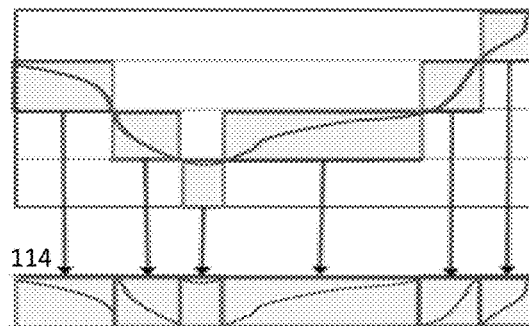
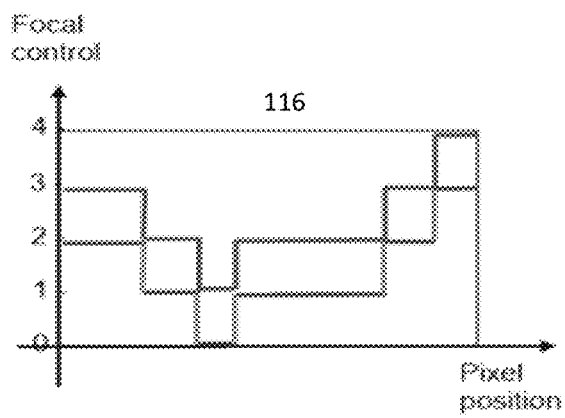
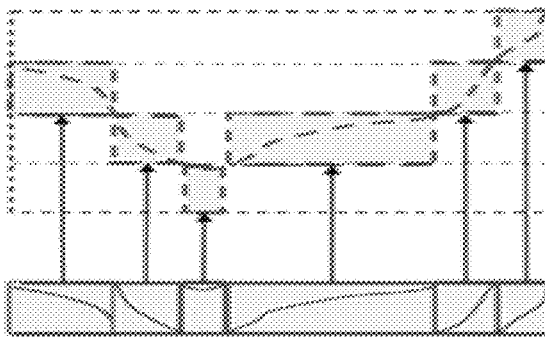
102 Receive three or more multiple focal planes (MFPs) for representing a three-dimensional image
104 Map the three or more MFPs to a plurality of mapped MFPs
106 Store pixel location data identifying focal distances of mapped pixels
108 Render for display a three-dimensional image using the mapped MFPs and focal distances
FIG. 1

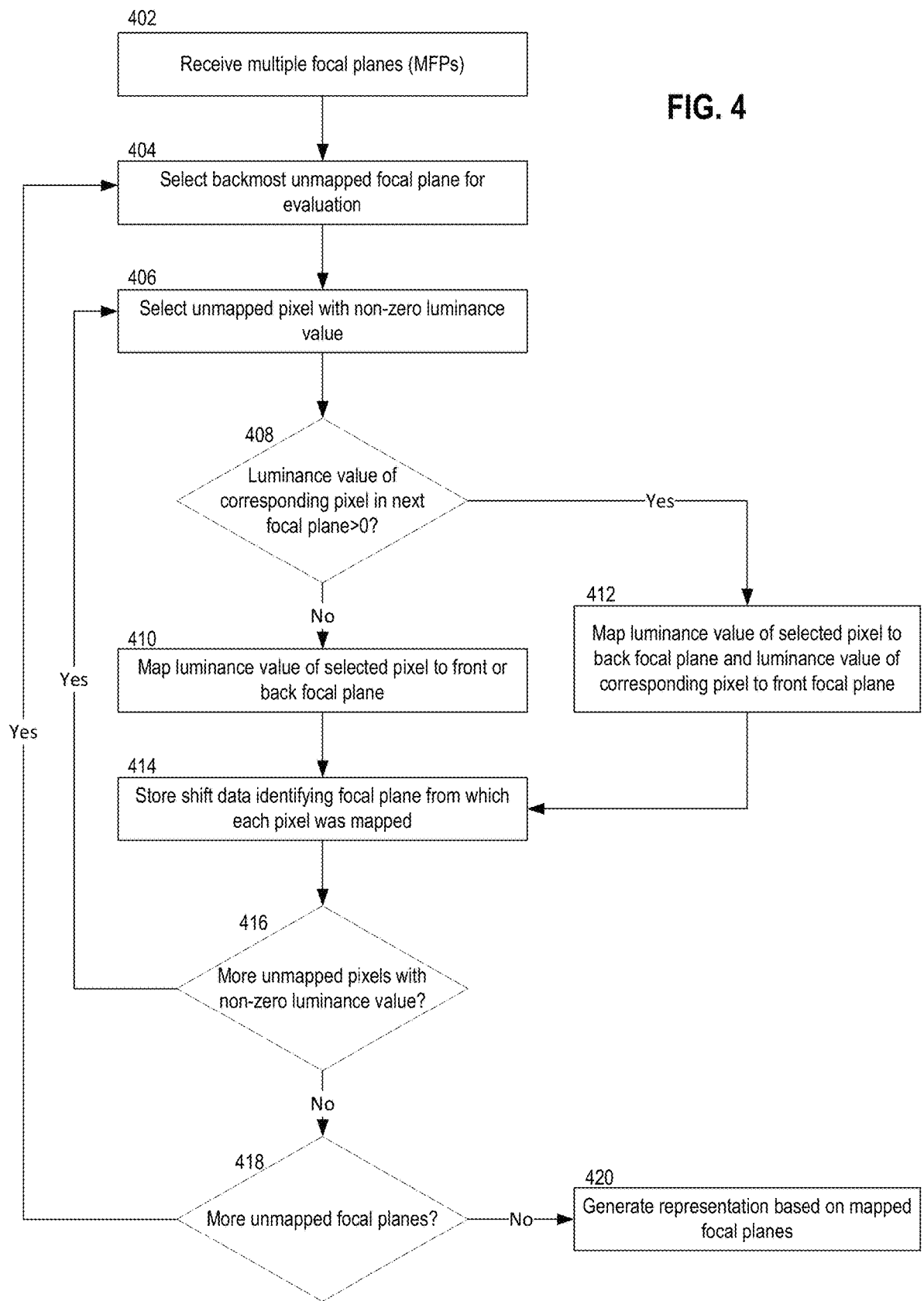

SYSTEMS AND METHODS FOR REDUCING A NUMBER OF FOCAL PLANES USED TO DISPLAY THREE-DIMENSIONAL OBJECTS

BACKGROUND

This disclosure is generally directed to display of three-dimensional objects through multiple focal planes. In particular, methods and systems are provided for mapping multiple focal planes to reduce a number of focal planes displayed.

SUMMARY

Head-mounted displays have been more frequently used in virtual and extended reality applications to display three-dimensional visuals to a user through use of display screens that are displayed to the eyes of a user. In many implementations, the image displayed is duplicated for both eyes to create a stereographic disparity which allows a user to sense depth in the object through vergence.

One issue with this approach is that a fixed screen location causes the accommodation of a user's eyes to stay unchanged when the user focuses on objects at various distances. The disparity between the accommodation of the user's eyes and the vergence of the eyes based on the perceived focal distance of the image, often referred to as vergence-accommodation conflict (VAC), can cause fatigue or discomfort for the user.

To address the aforementioned problem, in one approach, a depth-blending algorithm is used to generate multiple focal planes (MFPs) that are displayed on a stack of transparent displays. In one approach, such a stack of transparent displays can be used to render any set of voxels (e.g., a set of voxels of a frame of 3D media content). If a voxel of the frame happens to be mapped exactly to a focal plane, then voxel representation is displayed by lighting up a single location on a single display of the stack of transparent displays (e.g., as a pixel on that display). If a voxel of the frame does not map exactly to a focal plane, the display system will render such a voxel as a blended pixel using two closest displays of the stack of transparent displays. In particular, the voxel representation as a blended pixel may be achieved by lighting up (e.g., with weighted different luminance levels) two locations on two neighboring displays of the stack of transparent displays (e.g., as a pixel location on each of the displays). Such blending may be achieved using a suitable blending function (e.g., a linear depth blending function). Exemplary lineal blending function are described, e.g., in K. Akeley, et al., "A stereo display prototype with multiple focal distances," CM Trans. Graph. 23, 3, 804-813, 2004 which is incorporated herein, in its entirety. When viewed together the two blended pixels create a perception representation for the voxel of the 3D media content.

In one embodiment, each of the neighboring pairs of focal planes (displays of the stack of the displays) includes all blended pixels that are between a minimum focal distance of the focal plane and a maximum focal distance of the focal plane. For instance, the closest focal plane pair may include blended pixels that have a perceived focal distance of zero to one meter. The second closest focal plane pair may include blended pixels that have a perceived focal distance of one to five meters. By adding more focal planes, the VAC caused by shifting focus from a nearer object to a further object is reduced, as the further object is more likely to appear on a focal plane pair that is further from the user's eye than the closer object.

Unfortunately, the MFP approach has a few drawbacks. Objects that appear over several depths will often appear distorted as will objects that are rendered side-by-side at varying depths. Some of this distortion can be fixed with an increased number of focal planes, but generating a near-eye display device with increasing numbers of transparent displays can be difficult, can cause the end-product to be bulky, and can require substantial power to operate.

One solution to these problems is time-multiplexing where instead of displaying multiple images through successive transparent displays, the different images are displayed on a single display in rapid succession. Using time-multiplexing reduces the number of display elements, but substitutes the previous problems with flickering and/or loss of brightness. These issues are exacerbated when the number of focal planes is increased.

Another solution to these problems is to use multiple display panes that each display a different focal plane in a tiled format. A spatial light modulator may be used to adjust the view of the pixels of the different focal planes to different focal distances. Unfortunately, the number of tiled focal planes that can be used in this approach is limited, which then limits the depth acuity of the displayed objects.

To overcome such deficiencies, methods and systems are described herein for mapping focal planes to a smaller number of focal planes that can be displayed in the tiled format or the time-multiplexed format. A first plurality of focal planes created through depth-blending techniques are received at a computing system. The computing system maps the first plurality of focal planes down to at least one less focal plane, such as down to a front focal plane and a back focal plane by individually mapping pixel values to the focal planes and storing pixel location data identifying the original focal plane's focal distance. The reduced number of focal planes are then displayed in a tiled or time-multiplexed approach with the pixel location values being used to adjust the perceived distance of the pixels, such as through a phase function of a spatial light modulator.

The present disclosure addresses the balance between providing greater depth acuity through increased numbers of focal planes and the limitations on hardware of being able to display increased numbers of focal planes without creating additional issues. By mapping the focal planes down to a reduced number, such as down to two focal planes, but retaining data identifying original focal plane locations of pixels, the methods described herein preserve the depth acuity provided by higher numbers of focal planes while simultaneously reducing the number of required focal planes to be displayed.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 depicts an example method for reducing a number of focal planes for display of a three-dimensional image;

FIG. 4 is a flowchart of an illustrative process for mapping a plurality of focal planes;

DETAILED DESCRIPTION

Figure 2A:
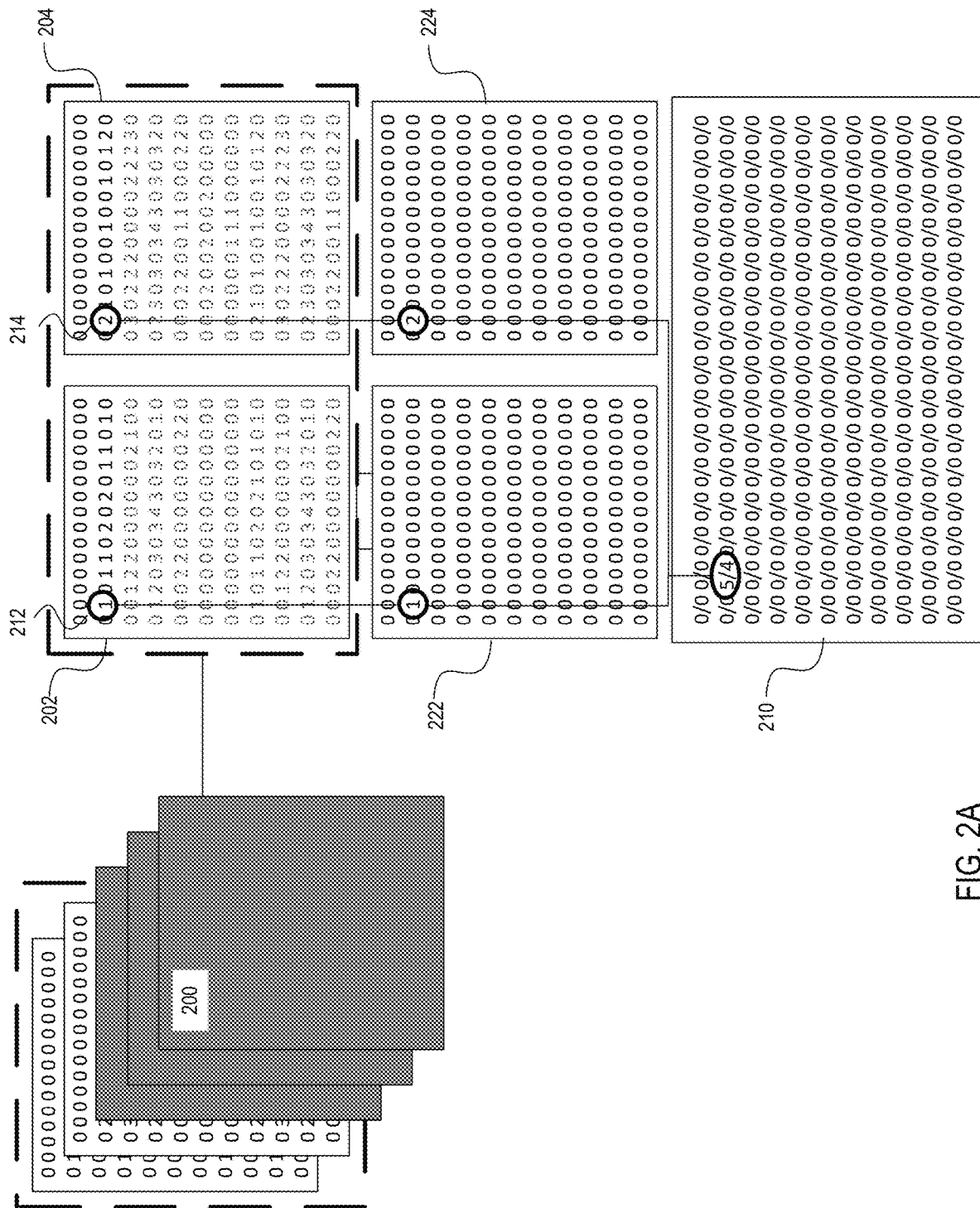
FIG. 2A depicts an example of mapping pixel luminance values when pixel luminance values in corresponding locations are greater than zero.

FIG. 1 depicts an example method for reducing a number of focal planes for display of a three-dimensional image. At step 102, three or more multiple focal planes (MFPs) for representing a three-dimensional image are received. A focal plane, as used herein, refers to a two-dimensional mapping of pixel luminance values that is used to generate a three-dimensional image. The focal planes may be implemented using a stack of displays, with each display corresponding to one of the planes. The MFPs may be generated from data representing a three-dimensional image (e.g., a 3D frame of 3D media content) using a depth-blending algorithm. In some embodiments, the MFPs are received from an external computing device. In other embodiments, a computing device generates the MFPs (e.g., based on information describing a set of 3D voxels) using a depth-blending algorithm and provides the data defining the MFPs to a processor which generates the mappings from the MFPs.

MFPs 110 comprise a graphical representation of a cross-section of a three-dimensional image displayed across a plurality of focal planes. Curve 112 depicts the intended appearance of focal depths of the cross-section of the three-dimensional image to provide a clear example of the methods described herein. Each section of curve 112 is represented by pixel values on one or more focal planes. For instance, the first section of curve 112 is generated from pixel luminance values on the third and fourth focal planes from the front (bottom) with the location of a pixel of the final image being dependent on a magnitude of the luminance values of that pixel in the third focal plane and the fourth focal plane. In some instances, a pixel luminance value may only exist on one focal plane, such as at the locations where the line moves between focal planes. In some instance, a pixel luminance value may exist across more than two focal planes, such as when a depth blending algorithm that is used to generate the MFPs blends a pixel value across more than two focal planes.

At step 104, the first plurality of focal planes are mapped to a second plurality of focal planes using the methods described herein. The second plurality of focal planes to which the first plurality of focal planes are mapped comprise at least one less focal plane than the first plurality of focal planes. In some embodiments, the first plurality of focal planes are mapped to a total of two focal planes, such as when pixel luminance values for any given pixel location only exist on a maximum of two focal planes (as depicted in FIG. 1). In other embodiments, the number of focal planes to which the first plurality of focal planes are mapped is determined as the highest number of focal planes that include corresponding pixel locations with a luminance value that is greater than zero. For instance, if pixels are blended across a maximum of four focal planes of a set of ten focal planes, then the ten focal planes may be mapped down to four focal planes.

FIG. 1 depicts an implementation where five focal planes are mapped down to two focal planes. Each portion of the curve 112 is represented in the five focal planes 110 as pixel luminance values on a maximum of two focal planes. For each pixel location with pixel luminance values in two focal planes, the pixel luminance value of the backmost focal plane is mapped to the first of mapped focal planes 114 and the pixel luminance value of the frontmost focal plane is mapped to the second of the mapped focal planes.

For each pixel location with a pixel luminance value in only one of the focal planes, the pixel luminance value is mapped to one of the backmost focal plane or frontmost focal plane according to some embodiments (e.g., such that its final rendering distance is not changed further or closer). In one approach, each pixel location with a pixel luminance value in only one of the focal planes may be included into a frontmost plane of the focal planes 114. In another approach, each pixel location with a pixel luminance value in only one of the focal planes may be included into a backmost plane of the focal planes 144. In yet another approach each of such pixel location may be included in the frontmost plane or the backmost plane at random or using another suitable selection technique.

At step 106, pixel location data identifying focal distances of mapped pixels is stored. For example, the computing device may store, for each mapped pixel, data identifying a focal plane from which the pixel was mapped. Graph 116 depicts a graph that of pixel location values that identify a focal plane from which the pixels were mapped, starting at focal plane 0 and ending at focal plane 4. While pixel location values are depicted as identifying the focal plane, in other embodiments the pixel location values may comprise the focal distance of the mapped focal plane. Alternatively, the computing device may store data identifying, for each focal plane, the focal distance of the focal plane. While FIG. 1 depicts the pixel location values as a graph, in some embodiments the pixel locations values are stored in a table and/or integrated into a phase function equation for rendering a three-dimensional image.

At step 108, a three-dimensional image is rendered for display using the mapped focal planes and the focal distances. For example, an HMD may display the two mapped focal planes on a display screen in a tiled and/or time multiplexed manner. Lenses may focus the images of the two mapped focal planes and a spatial multiplexing unit (SMU) may then remap the pixels to their different depths based on the mapped focal planes and phase functions for each pixel and/or set of pixels which are dependent on the stored pixel location values, such as in the device of FIG. 5. While embodiments are described with respect to the use of an SMU to cause the pixels to appear at different depths, any method of remapping pixel depths based on stored pixel location values may be used.

Figure 2B:
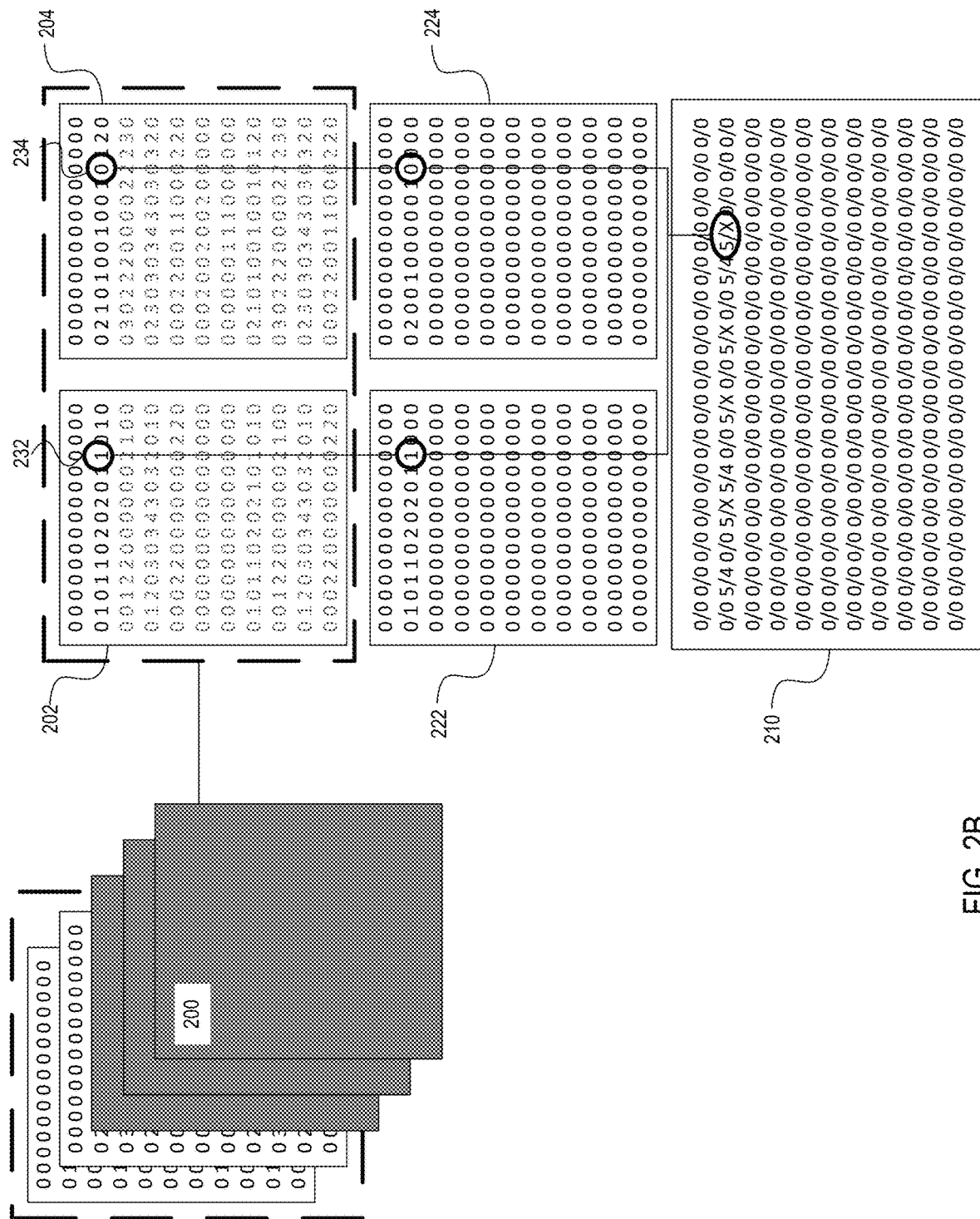
FIG. 2B depicts an example of mapping pixel luminance values when pixel luminance values in corresponding locations are not greater than zero.
Figure 2C:
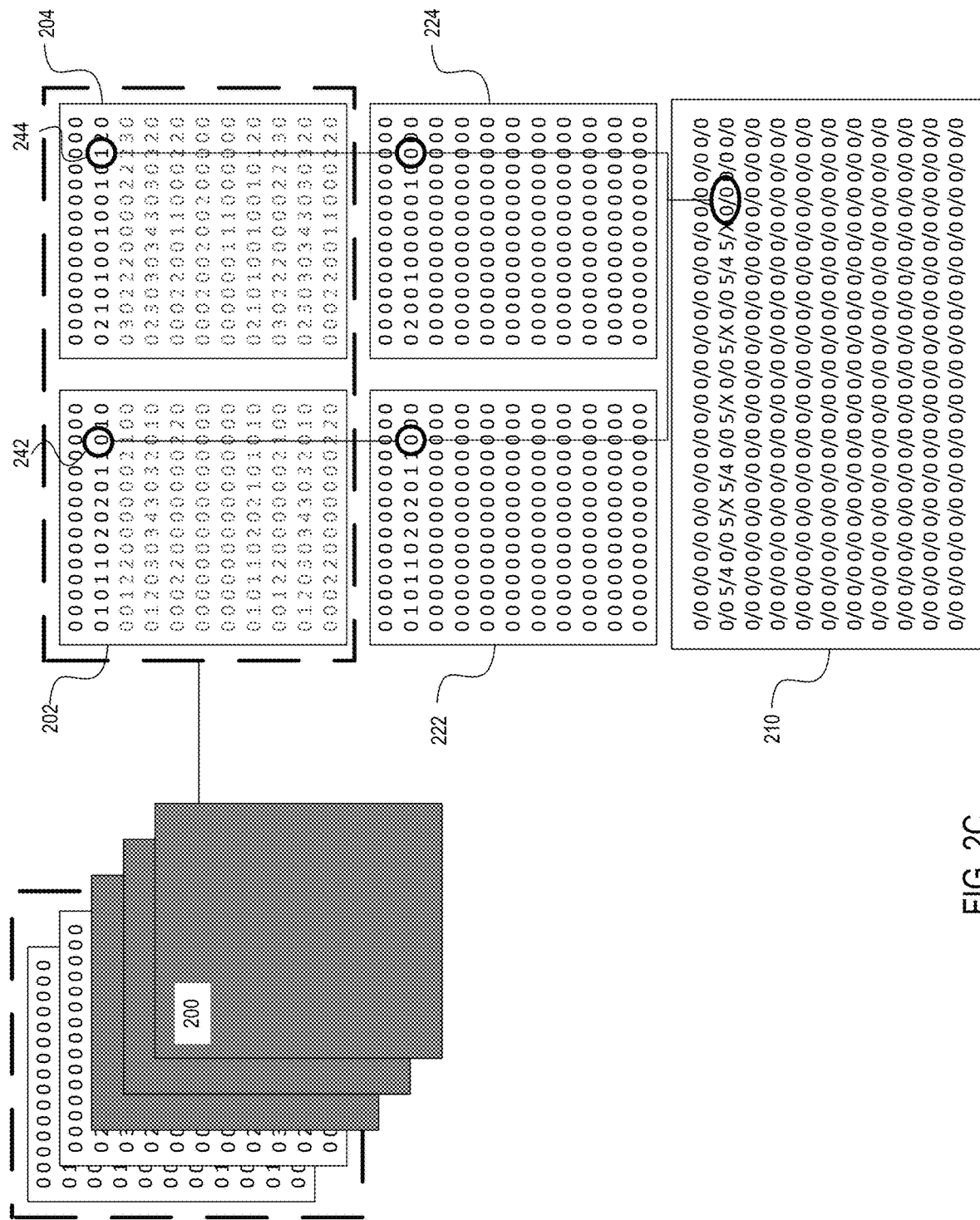
FIG. 2C depicts an example of mapping pixel luminance values when an evaluated pixel has a pixel luminance value of zero and the corresponding pixel has a luminance value that is greater than zero.

FIGS. 2A-2C depict examples of mapping pixel luminance values in first plurality of focal planes to two focal planes. The approaches depicted in FIGS. 2A-2C may comprise iterative approaches which begin at the backmost focal plane and are repeated for each focal plane until the front focal plane is reached. Alternatively, the iterative approach may begin with the frontmost focal plane and be repeated for each focal plane until the backmost focal plane is reached. Similarly, while the approach depicted begins with the top left pixel of the first focal plane and evaluates each pixel to the right followed by down, other approaches may begin with any other pixel and move in any other direction until the pixels of the focal plane are evaluated. The approaches depicted in FIGS. 2A-2C may be performed by a computing device that receives data defining pixel luminance values for multiple focal planes from an external computing device and/or receives data defining pixel luminance values for multiple focal planes at a mapping process from an internal process which produces the pixel luminance values for the multiple focal planes, such as through depth blending.

FIG. 2A depicts an example of mapping pixel luminance values when pixel luminance values in corresponding locations are greater than zero. MFP stack 200 comprises a plurality of focal planes comprising pixel luminance values for a plurality of apparent pixel locations. While five planes are shown, stack 200 may include any number of planes. An apparent pixel location comprises a three-dimensional coordinate where the pixel is intended to appear to generate a three-dimensional object. The apparent pixel locations are used to generate the focal planes which comprise data identifying the locations of pixel luminance values in two-dimensional space for each focal plane. Pixel luminance values of pixels at corresponding pixel locations across focal planes define the depth of the apparent pixel location. Corresponding pixel locations, as used herein, refers to pixel locations in different focal planes that exist at the same coordinates in two-dimensional space. Thus, the top left pixel of the first focal plane corresponds to the top left pixel of the second focal plane.

The process depicted in FIG. 2A begins with an evaluation of back focal plane 202. Back focal plane 202 comprises a plurality of pixel luminance values. In the first step of evaluating the back focal plane, pixels that have luminance values greater than zero are identified. The evaluation of back focal plane 202 may comprise an iterative process where first a pixel is evaluated to determine if the pixel luminance value is greater than zero and, if the pixel luminance value is greater than zero, further evaluation and mapping is performed as described herein. If the luminance value is not greater than zero, the next pixel value is evaluated. In other embodiments, locations of each pixel with a luminance value greater than zero are initially identified prior to further evaluation of corresponding pixels and mapping as described herein.

For each pixel luminance value that is greater than zero, a luminance value of a corresponding pixel in a next focal plane is evaluated. When the back focal plane 202 is being evaluated, the next focal plane 204 comprises the focal plane that is adjacent and in front of the back focal plane 202. Thus, in the example depicted, back focal plane 202 is the fifth focal plane from front to back and the next focal plane 204 is the fourth focal plane. A corresponding pixel, as used herein, refers to a pixel in a same x-y coordinate position as the evaluated pixel. For example, in FIG. 2A, pixel 212 of focal plane 202 is being evaluated. Pixel 214 of focal plane 204 is identified as the pixel of focal plane 204 that corresponds to the currently evaluated pixel 212 of focal plane 202.

If the corresponding pixel in the next focal plane has a pixel luminance value that is greater than zero, the evaluated pixel 212 is mapped to a first focal plane 222 and the corresponding pixel 214 is mapped to a second focal plane 224. In some embodiments, first focal plane 222 is a back focal plane and second focal plane 224 is a front focal plane. Thus, as back focal plane 202 is situated further back than next focal plane 204, pixels from back focal plane 202 are mapped to the backmost of the two focal planes. FIGS. 2A-2C provide an example where a backmost of two corresponding pixels is mapped to a back focal plane and a frontmost of two corresponding pixels is mapped to a front focal plane to provide a clear example and in other embodiments, pixel values may be mapped to either of the focal planes as long as one of the pixels is mapped to a first of the focal planes and the corresponding pixel is mapped to the second of the focal planes. Thus, two evaluated pixels could be mapped to different focal planes, as the focal plane to which the pixel is mapped does not necessarily have to be consistent for the application of the methods described herein.

In addition to the mapping of pixels to the two focal planes, data is stored identifying a focal plane from which the pixels originated. For instance, in FIG. 2 data 210 is stored identifying the evaluated pixel 212 in the first mapped focal plane 222 as originating from the fifth focal plane, i.e. focal plane 202, and corresponding 214 in the second mapped focal plane 224 as originating from the fourth focal plane, i.e. focal plane 204. In some embodiments, the stored data instead identifies a focal distance of the focal plane from which the pixel was mapped. Thus, instead of the stored data indicating the evaluated pixel 212 originated from the fifth focal plane, the stored data may indicate that the evaluated pixel 212 originated from a particular focal distance which corresponds to the fifth focal plane. Data 210 may be stored in any format that can identify a focal plane of original or a focal distance for each mapped pixel, such as the table depicted in FIG. 2.

FIG. 2B depicts an example of mapping pixel luminance values when pixel luminance values in corresponding locations are not greater than zero. During the evaluation of back focal plane 202, a pixel 232 with a non-zero pixel luminance value is identified where a corresponding pixel 234 in a next focal plane 204 comprises a pixel luminance value equal to zero. As the pixel luminance value of the pixel 232 is non-zero and the luminance value of the corresponding pixel 234 is equal to zero, only the luminance value of pixel 232 is mapped. The luminance value may be mapped to either focal plane 222 or 224 depending on the implementation?. Additionally, data is stored identifying the origin of the pixel luminance value that was mapped. As depicted in FIG. 2B the stored data 210 indicates that the mapped pixel 232 originated from the fifth focal plane, i.e. focal plane 202, and that there is no mapping for the corresponding pixel 234 which had a zero pixel luminance value.

FIG. 2C depicts an example of mapping pixel luminance values when an evaluated pixel has a pixel luminance value of zero and the corresponding pixel has a luminance value that is greater than zero. During evaluation of back focal plane 202, a pixel 242 is evaluated and a determination is made that the evaluated pixel 242 has a pixel luminance value of zero. As the luminance value of the evaluated pixel 242 equals zero, neither the evaluated pixel 242 nor the corresponding pixel 244 are mapped to the focal planes 222 and 224. Thus, the stored data 210 does not include an entry for the evaluated pixel 242 and corresponding pixel 244.

Figure 2D:
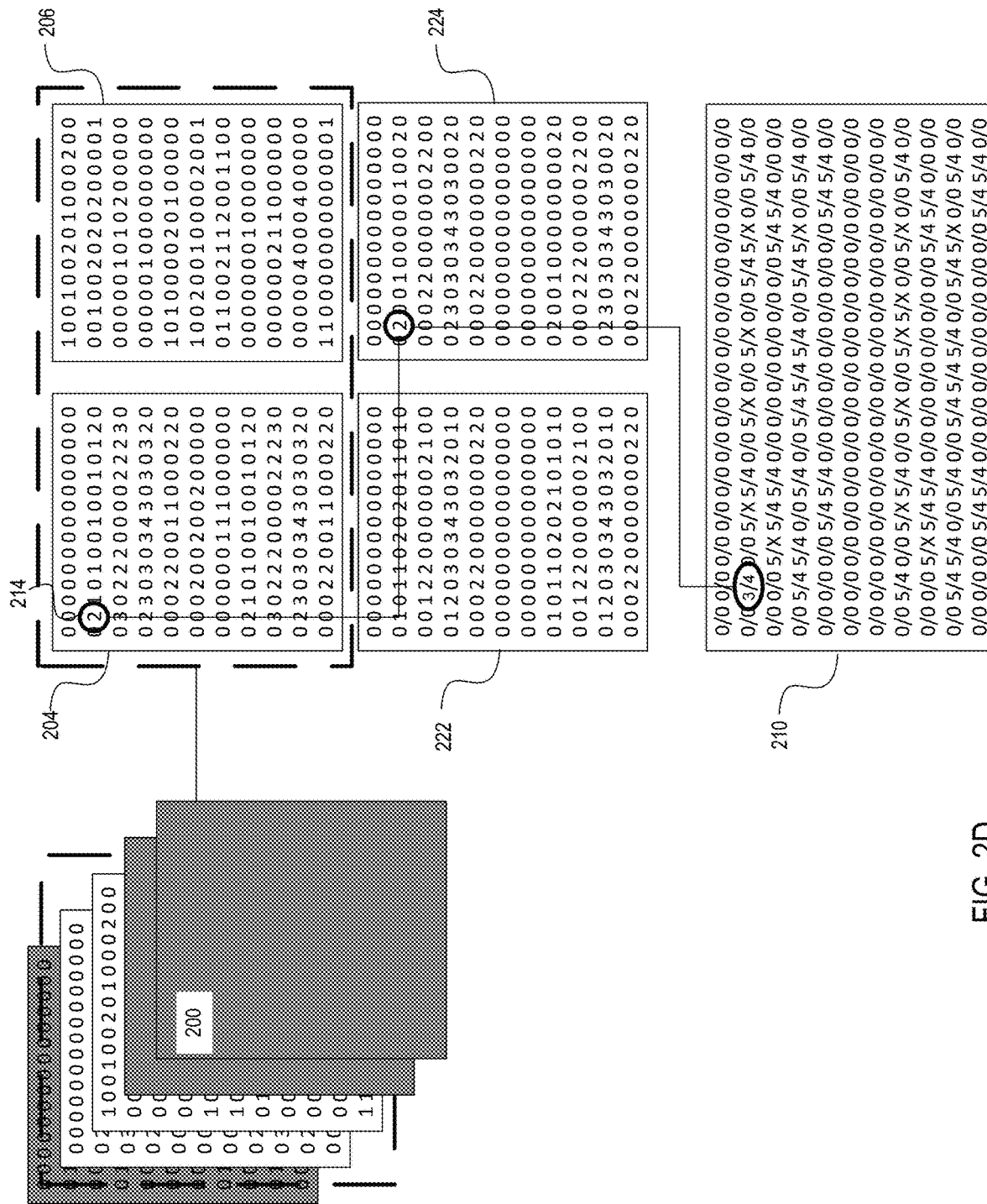
FIG. 2D depicts an example of mapping luminance values for a subsequent focal plane.

After each pixel of focal plane 202 has been evaluated, the method proceeds to evaluation of the next focal plane 204. FIG. 2D depicts an example of mapping luminance values for a subsequent focal plane. In FIG. 2D focal plane 204 is being evaluated after evaluation of focal plane 202 has been completed through the methods of FIGS. 2A-2C. When focal plane 204 is being evaluated, the corresponding pixels of the next focal plane 206 are evaluated in a similar method as was performed with respect to FIGS. 2A-2C with pixel luminance values being mapped to first focal plane 222 and second focal plane 224. During evaluation of focal plane 204, each pixel that has not been previously mapped during evaluation of the previous focal plane is analyzed. Pixel 214 was previously analyzed and mapped to focal plane 204 during the evaluation of focal plane 202. Thus, pixel 214 is skipped during the evaluation of focal plane 204.

Figure 2E:
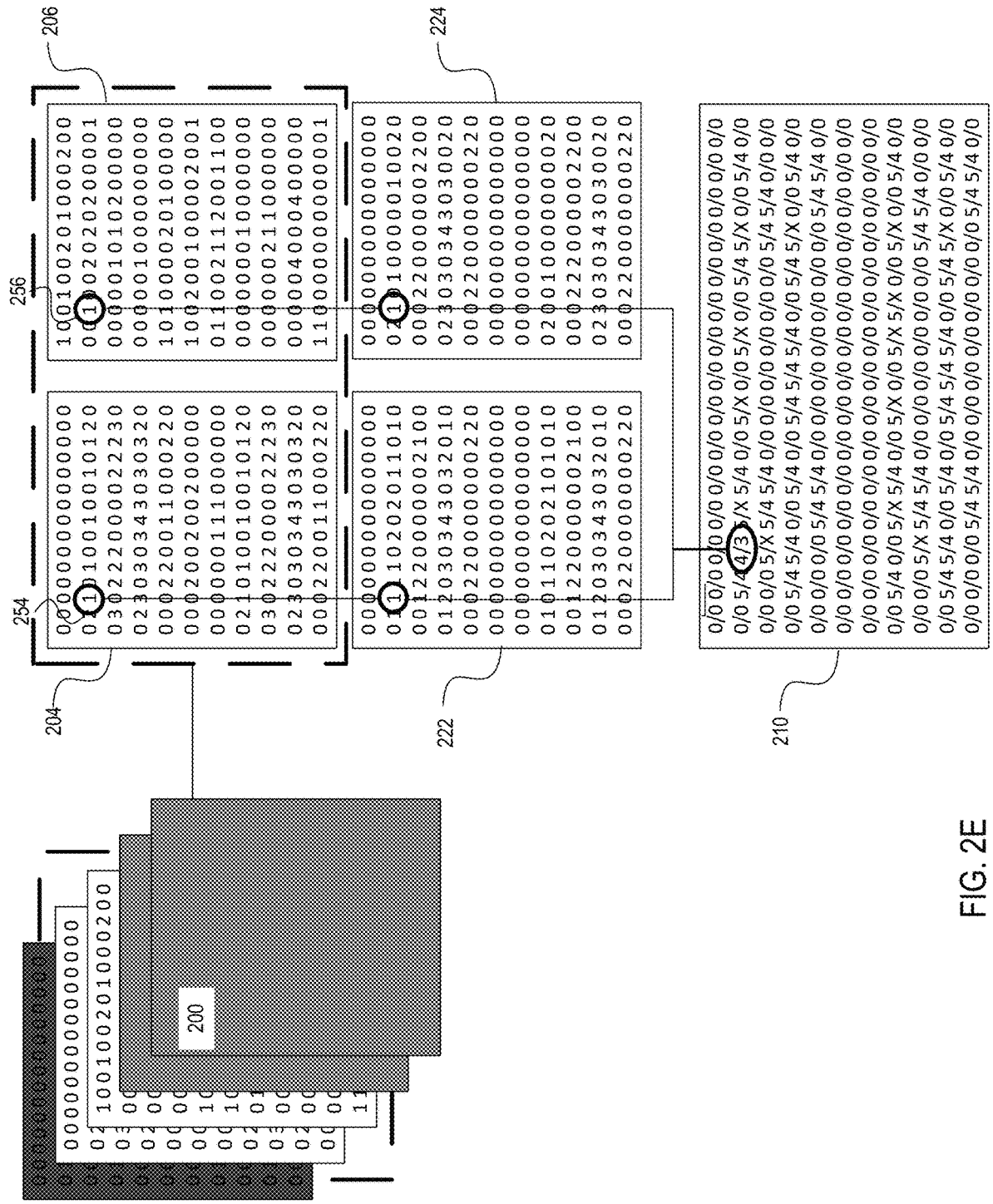
FIG. 2E depicts an example of mapping luminance values for a subsequent focal plane.

FIG. 2E depicts an example of mapping luminance values for a subsequent focal plane. In FIG. 2E, the first unevaluated non-zero pixel 254 is identified. The corresponding pixel 256 of focal plane 206 is also greater than zero. Thus, pixel 254 is mapped to focal plane 212 and pixel 256 is mapped to focal plane 214. When focal plane 202 was being evaluated, pixels from focal plane 204 were mapped to back focal plane 214. When focal plane 204 is evaluated, pixels from focal plane 204 are mapped to front focal plane 212. In this manner, pairs of pixels across focal planes are consistently mapped to a front and back focal plane respectively regardless of the location of the pair of focal planes. This additionally allows data 206 to be more compact as it can just identify one of the focal planes with the other focal plane being implied. Alternatively, mapping can be based on maximizing groupings of pixels for a specific focal plane so that the eventual adjusting of the view of the pixels is improved.

The process described with respect to FIG. 2A-2E may be repeated for each of the focal planes until all pixels have been mapped. For the final focal plane, pixels that are identified that have not yet been mapped and comprise luminance values greater than zero may be mapped to one of the focal planes without evaluating a corresponding pixel. Once the mapping has been completed, the two focal planes and the stored data can be provided to a near-eye device for display.

While the methods described herein with respect to FIGS. 2A-2E are described with respect to mapping pixel values from multiple focal planes down to two focal planes, other embodiments may be implemented to map multiple focal planes down to a higher number of focal planes. For instance, some implementations of depth-blending algorithms can create pixel values at a specific location along three or more focal planes. In instance where pixel values are mapped to more than two focal planes, the method may proceed similarly, with each pixel being evaluated in a first focal plane, but with an identification of pixels in subsequent focal planes up to the number of focal planes to which the mapping is being performed. For example, for a pixel that is evaluated to be non-zero, the pixel in the next corresponding focal plane is evaluated. If that pixel value is zero, only the initially evaluated pixel is mapped. If the corresponding pixel value is greater than zero, the next pixel is evaluated. If that pixel has a luminance value of zero, the first two pixels are mapped to the first two focal planes. If that pixel has a luminance value greater than zero, a next corresponding pixel is evaluated until a pixel with a luminance value of zero is identified or a number of pixels have been evaluated equal to the mapped number of focal planes.

In some embodiments, a system determines a number of focal planes to which to map the pixels as the highest number of focal planes with corresponding pixel values greater than zero. For example, the system may determine, for each pixel, a number of focal planes that have a pixel luminance value greater than zero for the pixel. The system may identify the highest number of focal planes and set that number as the number of focal planes to which the mapping is performed. Thus, if most pixels comprise luminance values greater than zero in only two focal planes but a few pixels comprise luminance values greater than zero in three focal planes, the system may map the pixels to three focal planes instead of two.

Alternatively, the system may select a number of focal planes that would capture greater than a threshold number of pixels. For instance, the system may store a threshold number or percentage, such as 95%. If the number of pixels that comprise luminance values greater than zero across a particular number of focal planes is less than the threshold value, the system may increase the number of focal planes until at least the threshold number or percentage of pixels are captured. For pixels that contain values across more focal planes than the mapping, the system may discard the lowest pixel luminance values, the backmost pixel luminance values, or the frontmost pixel luminance values until the pixel only contains pixel luminance values in the maximum number of focal planes to which the mapping is being performed.

Figure 3A:
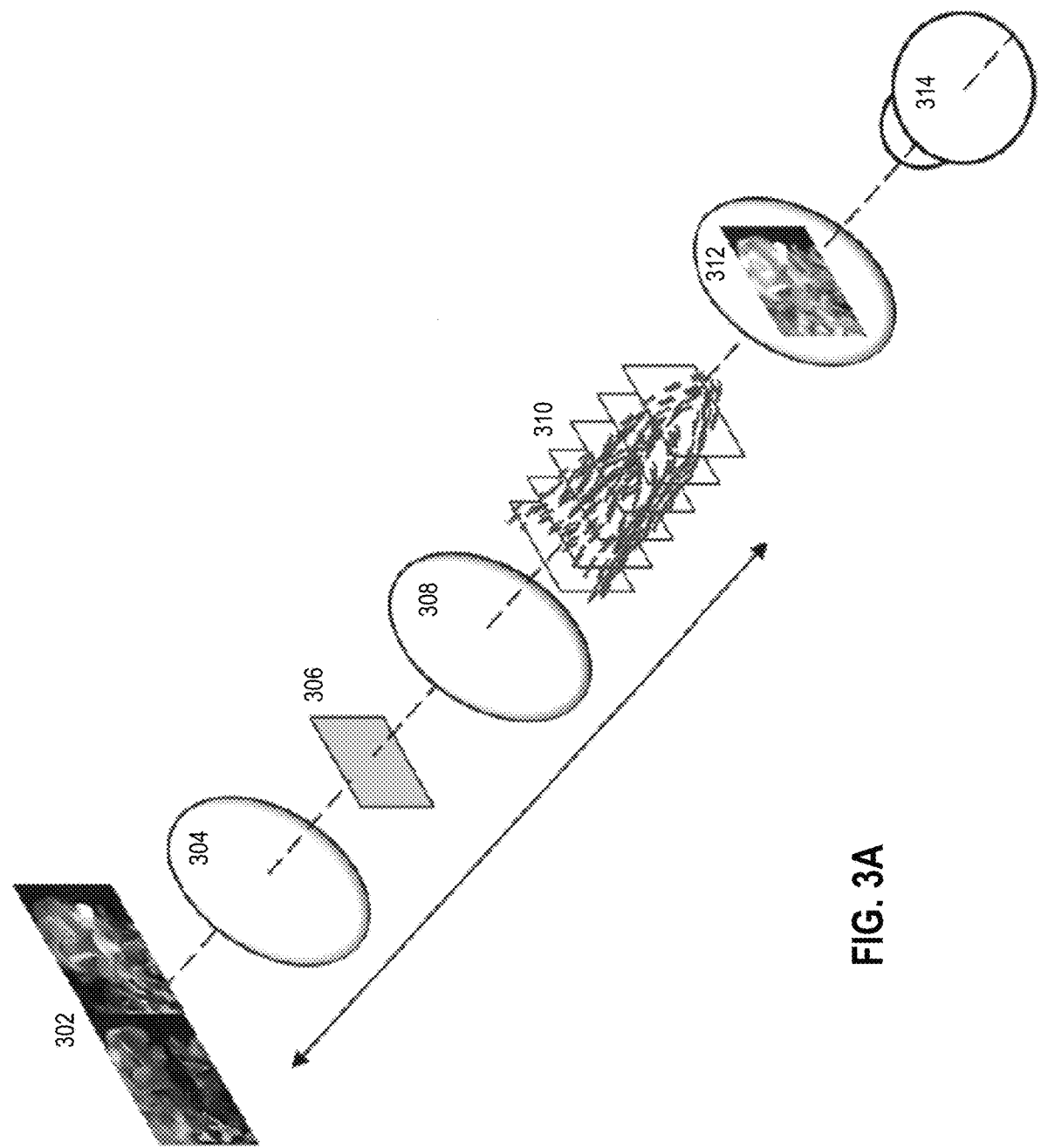
FIG. 3A depicts an example system that can be used to render an image using mapped pixel luminance values.

FIG. 3A depicts an example system that can be used to render an image using mapped pixel luminance values. Display screen 302 comprises a display configured to display the mapped pixel luminance values. As depicted in FIG. 3, display screen 302 comprises two displays, one for each mapped focal plane. In implementations where the pixel luminance values are mapped to more than two focal planes, display screen 302 may be configured to display the higher number of focal planes. Light emanating from display screen 302 is collimated by lens 304. A spatial multiplexing unit (SMU) 306 functions as a multifocal off-axis Fresnel lens that adds quadratic and linear phase terms to an incident wavefront. The quadratic phase terms can axially shift pixels to the designated depths, while the linear phase terms can laterally shift the centers of pixels to the optical axis. As a result, the pixels of the sub-panel images can be mapped to different axial locations and laterally aligned at the output end. Using existing SMU technology for shifting portions of the image, the system can use the mapping data to determine where to shift each of the pixels and modify the SMU to shift the pixels to their original locations.

The light that passes through SMU 306 is collimated by lens 308 to create optically mapped pixels 310 at the different depths. The final output image is collected by eyepiece 312 and displayed to a user's eyeball 314.

Figure 3B:
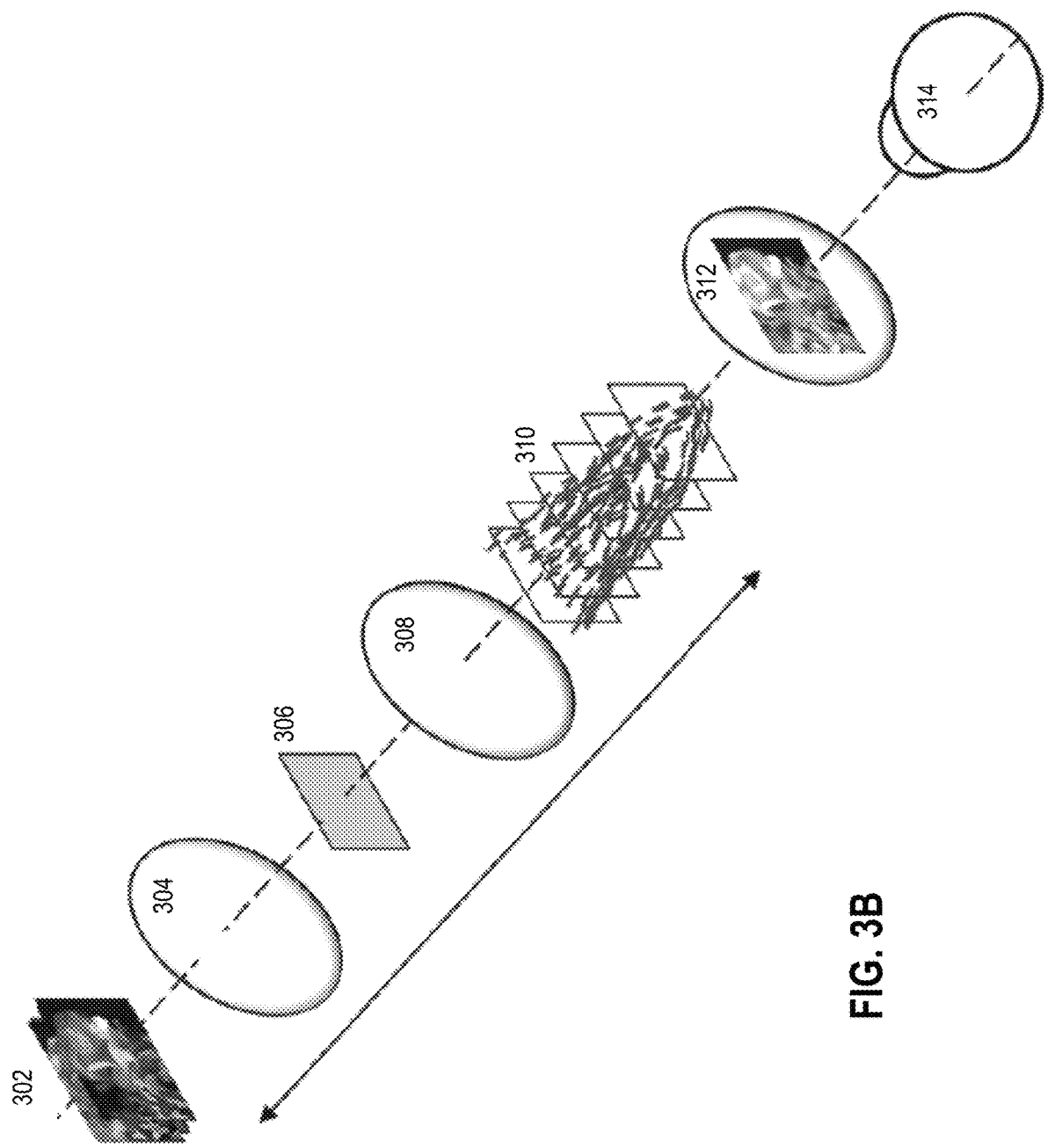
FIG. 3B depicts an example system that can be used to render an image using mapped pixel luminance values.

FIG. 3B depicts an example system that can be used to render an image using mapped pixel luminance values. Display screen 302 comprises a display configured to display the mapped pixel luminance values. Where FIG. 3A depicted a display screen simultaneously displaying the mapped focal planes with the shifting involving both an axial and lateral shift, in FIG. 3B, time multiplexing is used where the display screen 302 shifts between displaying different focal planes at regular intervals, such as every sixtieth of a second. The light is collimated by lens 304 and provided to SMU 306. While SMU 306 no longer adjusts the pixel luminance values laterally, SMU 306 is configured to switch the axial adjustment of the pixels in time with the shifting of the display. Thus, the SMU may perform a first adjustment when the first focal plane is being displayed and a second adjustment when the second focal plane is being displayed, the adjustment including the shifting of pixel luminance values to their initial focal planes based on the stored data. The light that passes through SMU 306 is collimated by lens 308 to create optically mapped pixels 310 at the different depths. The final output image is collected by eyepiece 310 and displayed to a user's eyeball 312.

While FIG. 3 depicts the use of an SMU as a spatial light modulator to adjust the wavelength of the produced light to cause formation of the three-dimensional image, the methods described herein are not limited to the use of a spatial light modulator to remap the image for display. Any other method of adjusting the viewing location of the mapped pixels can be used that can adjust the locations based on stored data indicating a focal length to which the image is to be adjusted.

FIG. 4 is a flowchart of an illustrative process for mapping a plurality of focal planes. In various embodiments, the individual steps of process 400 may be implemented by one or more components of the devices and systems of FIGS. 5-6. Although the present disclosure may describe certain steps of the process (and of other processes described herein) as being implemented by certain components of the devices and systems of FIGS. 5-6, this is for purposes of illustration only, and it should be understood that other components of the devices and systems of FIGS. 5-6 may implement those steps instead.

At step 402, input/output circuitry of a computing device receives data defining multiple focal planes. The input/output circuitry may receive the data from an external device and/or from internal storage. For example, control circuitry of the computing device may execute a depth blending algorithm to generate data defining pixel luminance values for multiple focal planes based on data defining voxel positions for a three-dimensional object. The data defining multiple focal planes comprises data defining, for each of the focal planes, locations in two-dimensional space and pixel luminance values for a plurality of pixels in the focal plane.

At step 404, control circuitry of the computing device selects a backmost unmapped focal plane for evaluation. For example, the control circuitry of the computing device may perform the method described herein iteratively beginning with the back focal plane and continuing forward. In other embodiments, the control circuitry of the computing device begins the mapping process with the front focal plane and continues evaluating focal planes backwards.

At step 406, control circuitry of the computing device selects an un-mapped pixel with a non-zero luminance value. For example, the control circuitry of the computing device may perform the method described herein iteratively for each of the pixel luminance values for a particular focal plane. As used herein, selecting a pixel with a non-zero luminance value comprises identifying, in the data defining the focal planes, a location in the focal plane with a non-zero luminance value for a pixel.

At step 408, control circuitry of the computing device determines if a luminance value of a corresponding pixel in a next focal plane is greater than zero. For example, the control circuitry of the computing device may identify a pixel at a same two-dimensional location in an adjacent focal plane, such as a next focal plane towards the front focal plane if evaluating from the back focal plane forward or a next focal plane towards a back focal plane if evaluating from the front focal plane backwards. The pixel luminance value for the corresponding pixel in the next focal plane may be greater than zero when a voxel represented by the evaluated pixel and the corresponding pixel has a three-dimensional location in between the evaluated focal plane and the next evaluated focal plane.

If the luminance value of the corresponding pixel is greater than zero, at step 412, the control circuitry of the computing device maps the luminance value of the selected pixel to the back focal plane and the luminance value of the corresponding pixel to the front focal plane. As used herein, "back" and "front" are designations of focal planes used to denote the relative positions of pixel luminance values from which the luminance values are mapped. The terms "back" and "front" do not denote a location of the focal planes themselves or a location where they are displayed (as implementations include side-by-side display and time multiplexing).

In embodiments where the evaluation begins at the frontmost focal plane, the selected pixel may be mapped to the front focal plane while the corresponding pixel is mapped to the back focal plane. In some embodiments, the values are mapped to the different focal planes depending on factors other than the relative positions of the pixel luminance values to each other. For example, the control circuitry of the computing device may map pixels to optimize groupings of pixels originating from a same focal plane on a same focal plane, thereby reducing a difficulty of adjusting the displayed locations of the pixels. Mapping the pixel luminance value to a focal plane comprises storing, for the focal plane, data identifying the pixel luminance value and the location in two-dimensional space of the pixel luminance value.

If the luminance value of the corresponding pixel is not greater than zero, at step 410, the control circuitry of the computing device writes the luminance value of the selected pixel to either the back focal plane or the front focal plane (e.g., such that its final rendering distance is not changed further or closer). In some embodiments, when the pixel luminance value for the corresponding pixel is equal to zero, the pixel luminance value for the selected pixel is always written to the front focal plane or always the back focal plane. In other embodiments, the control circuitry selects either the front focal plane or the back focal plane at random. In yet another embodiment, the control circuitry selects one of the back focal plane or front focal plane as an optimal focal plane, based on, e.g., which focal plane has a larger number of pixel luminance values in a surrounding area that originate from a same focal plane as the selected pixel.

At step 414, control circuitry of the computing system stores data identifying the focal planes from which the pixel or pixels were mapped. For example, if the corresponding pixel had a luminance value equal to zero, the computing system may store data indicating the focal plane from which the selected pixel originated, such as the fifth focal plane. If the corresponding pixel had a luminance value greater than zero, the computing system may store data indicating the focal plane from which the selected pixel originated and the focal plane from which the corresponding pixel originated. Alternatively, if the pixels are mapped to focal planes based on their relative positions to each other, such as with a front and back focal plane, the stored data may identify one of the focal planes as the other focal plane can be inferred from the location of the identified focal plane. For example, if the data identifies the pixel location of the front pixel as being from the fourth focal plane, the pixel location of the back pixel can be inferred to be from the fifth focal plane. In some embodiments, the stored data identifies the focal distance of the focal plane from which the pixels were mapped.

At step 416, control circuitry of the computing system determines whether there are additional unmapped pixels in the selected focal plane with a non-zero luminance value. An unmapped pixel comprises a pixel that has not had its luminance value stored in one of the mapped focal planes through evaluation of a current focal plane or a previous focal plane, such as when the pixel comprises a corresponding pixel that is mapped due to a selected pixel having a luminance value greater than zero and the corresponding pixel having a luminance value greater than zero.

If the control circuitry determines that there are additional unmapped pixels with a non-zero luminance value in the selected focal plane, the process reverts to step 406 and a new unmapped pixel with non-zero luminance value is selected. The process then proceeds with steps 408-414 for the next unmapped pixel. The process continues in this fashion until each pixel with a non-zero luminance value has been mapped.

After all the pixels with a non-zero luminance value have been mapped to one of the focal planes, at step 418, control circuitry of the computing system determines whether there are additional unmapped focal planes. An unmapped focal plane comprises a focal plane that has not been evaluated for mapping of pixel values from the focal plane during the process described herein. Pixel luminance values from an unmapped focal plane may have been previously mapped due to the unmapped focal plane containing pixels that correspond to pixels of a previously mapped focal plane that had a non-zero luminance value.

If the control circuitry determines that there are additional unmapped focal planes, the process reverts to step 404 and a new focal plane is selected. The process then proceeds with steps 406-416 for the next selected focal plane and each unmapped pixel in the next focal plane with a non-zero luminance value is mapped to a focal plane. The process continues in this fashion until each focal plane is mapped. It is noted that for the mapping of the final focal plane, step 408 and 412 are not performed as there is no "next" focal plane.

At step 420, control circuitry of the computing device generates a representation of a three-dimensional object based on the mapped focal planes. For example, control circuitry of the computing device may display the mapped focal planes simultaneously and/or serially and use hardware, such as a spatial light modulator to adjust the perceived locations of the pixel luminance values. Additionally or alternatively, input/output circuitry of the computing device may transmit data defining the mapped focal planes and the data identifying initial focal planes of the mapped pixels to a near-eye device which displays the mapped focal planes with the adjustments described herein. In some embodiments, the control circuitry of the computing device generates the modifications for the phase functions for a spatial light modulator based on the locations of pixels and the focal distances of the focal planes from which they were mapped.

Figure 5:
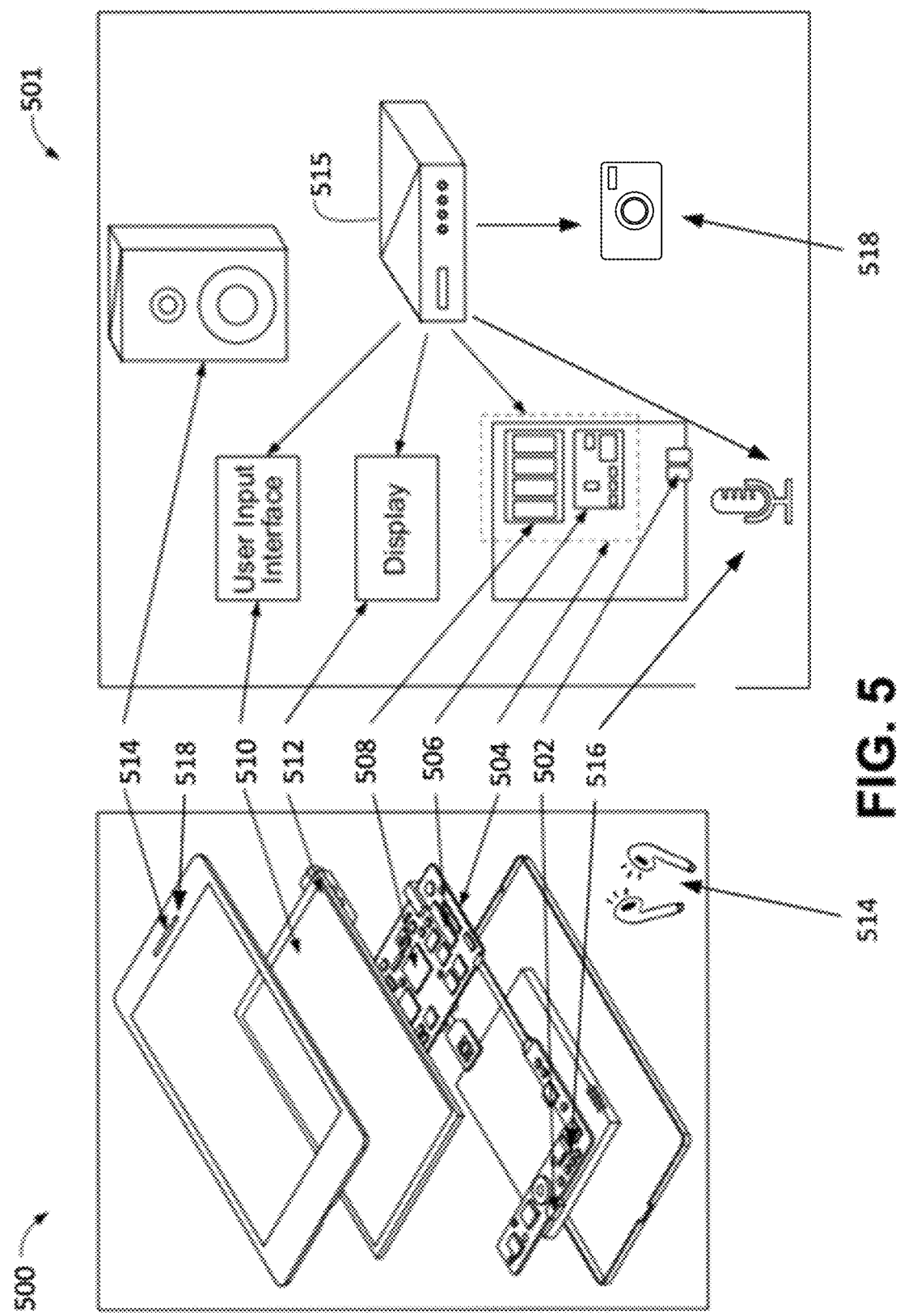
FIG. 5 shows generalized embodiments of illustrative user equipment devices which may perform the functions described herein.
Figure 6:
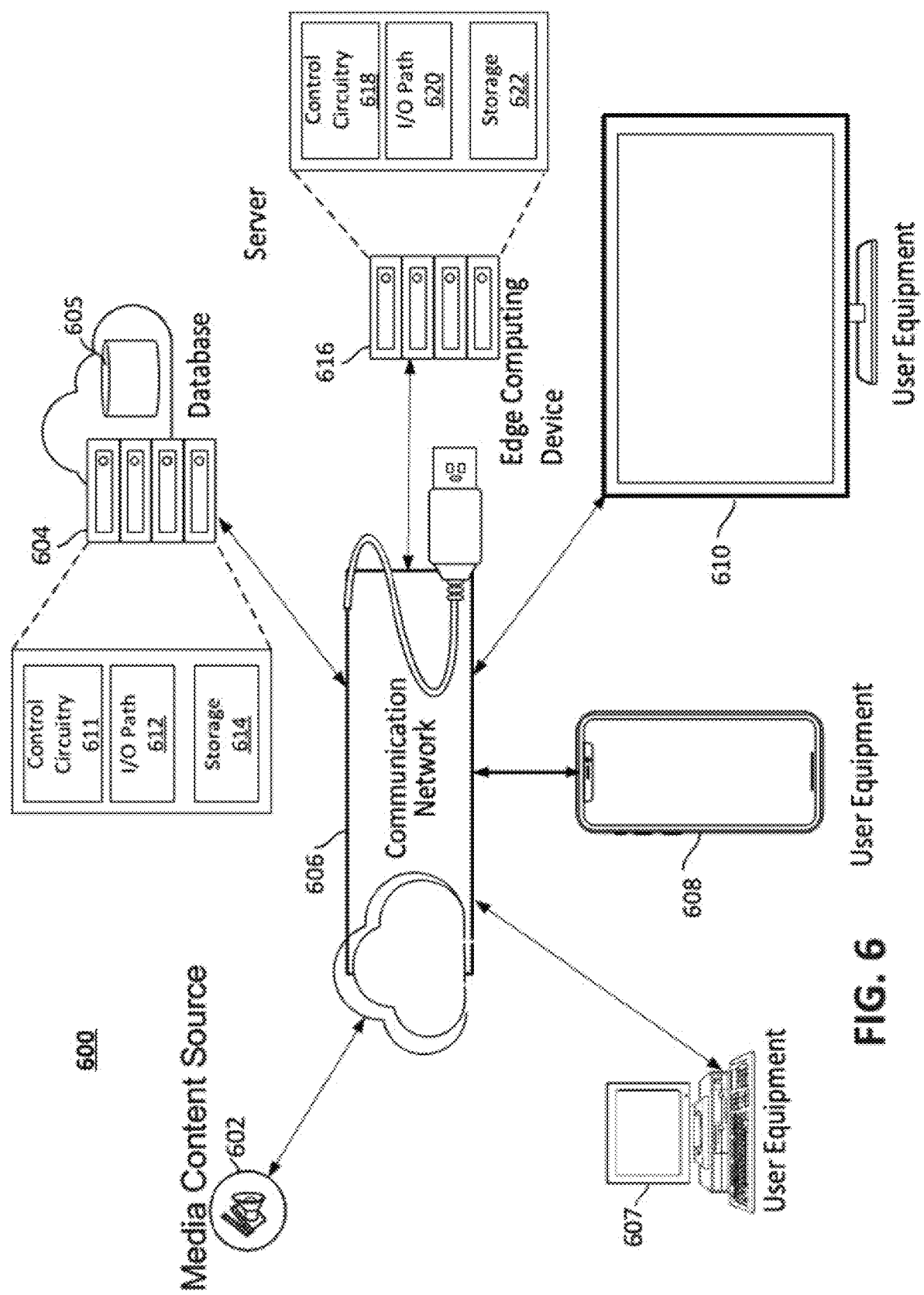
FIG. 6 is a diagram of an illustrative system 600 for encoding/decoding, in accordance with some embodiments of this disclosure.

FIGS. 5-6 depict illustrative devices, systems, servers, and related hardware for image encoding/decoding. FIG. 5 shows generalized embodiments of illustrative user equipment devices which may perform the functions described herein. User equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display, computer display or a head mounted display comprising a stack of displays. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the codec application stored in memory (e.g., storage 508). Specifically, control circuitry 504 may be instructed by the codec application to perform the functions discussed above and below. In some implementations, processing or actions performed by control circuitry 504 may be based on instructions received from the codec application.

In client/server-based embodiments, control circuitry 504 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the codec application may be a client/server application where only the client application resides on device 500 (e.g., device 104), and a server application resides on an external server (e.g., server 604 and/or server 616). For example, the codec application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the codec application may instruct control 611 or 618 circuitry to perform processing tasks for the client device and facilitate the encoding/decoding.

Control circuitry 504 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as codec application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The codec application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the codec application may be downloaded and interpreted or otherwise run by an interpreter or virtual machine (run by control circuitry 504). In some embodiments, the codec application may be encoded in the ETV Binary Interchange Format (EBIF), received by control circuitry 504 as part of a suitable feed, and interpreted by a user agent running on control circuitry 504. For example, the codec application may be an EBIF application. In some embodiments, the codec application may be defined by a series of JAVA-based files that are received and run by a local virtual machine or other suitable middleware executed by control circuitry 504. In some of such embodiments (e.g., those employing MPEG-2 or other digital media encoding schemes), codec application may be, for example, encoded and transmitted in an MPEG-2 object carousel with the MPEG audio and video packets of a program.

FIG. 6 is a diagram of an illustrative system 600 for encoding/decoding, in accordance with some embodiments of this disclosure. User equipment devices 607, 608, 610 (e.g., which may correspond to one or more of computing device 500 or 501 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the codec application may be executed at one or more of control circuitry 611 of server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide encoding/decoding data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., encoding/decoding) in connection with ongoing processing of video data. In some embodiments, a plurality of edge computing devices 616 may be strategically located at various geographic locations, and may be mobile edge computing devices configured to provide processing support for mobile devices at various geographical regions.

What is claimed is:

1. A method comprising:
   receiving data defining a three-dimensional image according to a first plurality of focal planes;
   mapping pixel luminance values from the first plurality of focal planes to a second plurality of focal planes comprising fewer focal planes than the first plurality of focal planes;
   storing, for the mapped pixel luminance values, pixel location data identifying initial focal distances of the mapped pixel luminance values in the first plurality of focal planes;
   storing the second plurality of focal planes for display by a near-eye display device;
   providing the pixel location data to the near-eye device, wherein the near-eye device uses the pixel location data to cause formation of a three-dimensional image from a display of the second plurality of focal planes based on the pixel location data identifying initial focal distances of the mapped pixel luminance values in the first plurality of focal planes.

2. The method of claim 1, wherein the mapping pixel luminance values from the first plurality of focal planes to the second plurality of focal planes comprises:
   identifying a first pixel of a first focal plane of the first plurality of focal planes that has a luminance value that is greater than zero;
   determining that a luminance value of a corresponding second pixel in a second focal plane of the first plurality of focal planes is greater than zero;
   in response to the determining that the luminance value of the second pixel is greater than zero, storing the luminance value for the first pixel as a luminance value of a first mapped pixel on a first mapped focal plane of the second plurality of focal planes and storing the luminance value for the second pixel as a luminance value of a second mapped pixel on a second mapped focal plane of the second plurality of focal planes;
   identifying a third pixel of the second focal plane that has a luminance value that is greater than zero;
   determining that a luminance value of a corresponding fourth pixel in a third focal plane of the first plurality of focal planes is greater than zero; and
   in response to the determining that the luminance value of the fourth pixel is greater than zero, storing the luminance value for the third pixel as a luminance value of a third mapped pixel on the first mapped focal plane and storing the luminance value for the fourth pixel as a luminance value of a fourth mapped pixel on the second mapped focal plane.

3. The method of claim 2, further comprising:
   in response to storing the luminance value of the first mapped pixel and the luminance value of the second mapped pixel, storing pixel location data for the first mapped pixel or the second mapped pixel based on a focal distance of the first focal plane or second focal plane.

4. The method of claim 2, further comprising:
   identifying a fifth pixel of the first focal plane of the first plurality of focal planes that has a luminance value that is greater than zero;
   determining that a luminance value of a corresponding sixth pixel in the second focal plane of the first plurality of focal planes is equal to zero;
   in response to the determining that the luminance value of the sixth pixel is equal to zero, storing the luminance value for the fifth pixel as a luminance value of a fifth mapped pixel on the first mapped focal plane of the second plurality of focal planes.

5. The method of claim 2, further comprising:
   identifying a fifth pixel of the first focal plane of the first plurality of focal planes that has a luminance value that is greater than zero;
   determining that a luminance value of a corresponding sixth pixel in the second focal plane of the first plurality of focal planes is equal to zero;
   in response to the determining that the luminance value of the sixth pixel is equal to zero, storing the luminance value for the fifth pixel as a luminance value of a fifth mapped pixel on the second mapped focal plane of the second plurality of focal planes.

6. The method of claim 1, wherein the near-eye device using the pixel location data to cause formation of a three-dimensional image comprises:
   adjusting, by a spatial light modulator, a wavelength of light produced by the display of the second plurality of focal planes based on a phase function determined based on the pixel location data.

7. The method of claim 1, further comprising:
   identifying a pixel location that has a luminance value that is greater than zero in a highest number of the first plurality of focal planes;
   determining that a number of the first plurality of focal planes in which the pixel location has a luminance value that is greater than zero is at least one less than a total number of the first plurality of focal planes and, in response, selecting the number as a number of the second plurality of focal planes to which the first plurality of focal planes are to be mapped.

8. The method of claim 1, wherein the near-eye display displays the second plurality of focal planes by simultaneously displaying the second plurality of focal planes in different locations of a display.

9. The method of claim 1, wherein the near-eye display displays the second plurality of focal planes by shifting between displaying different focal planes of the second plurality of focal planes on a display.

10. A system comprising:
    input/output circuitry configured to receive data defining a three-dimensional image according to a first plurality of focal planes;
    control circuitry configured to:
    map pixel luminance values from the first plurality of focal planes to a second plurality of focal planes comprising fewer focal planes than the first plurality of focal planes;
    store, for the mapped pixel luminance values, pixel location data identifying initial focal distances of the mapped pixel luminance values in the first plurality of focal planes;
    store the second plurality of focal planes for display by a near-eye display device;
    provide the pixel location data to the near-eye device, wherein the near-eye device uses the pixel location data to cause formation of a three-dimensional image from a display of the second plurality of focal planes based on the pixel location data identifying initial focal distances of the mapped pixel luminance values in the first plurality of focal planes.

11. The system of claim 10, wherein, when mapping pixel luminance values from the first plurality of focal planes to the second plurality of focal planes, the control circuitry is further configured to:
    identify a first pixel of a first focal plane of the first plurality of focal planes that has a luminance value that is greater than zero;
    determine that a luminance value of a corresponding second pixel in a second focal plane of the first plurality of focal planes is greater than zero;
    in response to the determining that the luminance value of the second pixel is greater than zero, store the luminance value for the first pixel as a luminance value of a first mapped pixel on a first mapped focal plane of the second plurality of focal planes and storing the luminance value for the second pixel as a luminance value of a second mapped pixel on a second mapped focal plane of the second plurality of focal planes;
    identify a third pixel of the second focal plane that has a luminance value that is greater than zero;
    determine that a luminance value of a corresponding fourth pixel in a third focal plane of the first plurality of focal planes is greater than zero; and
    in response to the determining that the luminance value of the fourth pixel is greater than zero, store the luminance value for the third pixel as a luminance value of a third mapped pixel on the first mapped focal plane and storing the luminance value for the fourth pixel as a luminance value of a fourth mapped pixel on the second mapped focal plane.

12. The system of claim 11, wherein the control circuitry is further configured to:
    in response to storing the luminance value of the first mapped pixel and the luminance value of the second mapped pixel, store pixel location data for the first mapped pixel or the second mapped pixel based on a focal distance of the first focal plane or second focal plane.

13. The system of claim 11, wherein the control circuitry is further configured to:
    identify a fifth pixel of the first focal plane of the first plurality of focal planes that has a luminance value that is greater than zero;
    determine that a luminance value of a corresponding sixth pixel in the second focal plane of the first plurality of focal planes is equal to zero;
    in response to the determining that the luminance value of the sixth pixel is equal to zero, store the luminance value for the fifth pixel as a luminance value of a fifth mapped pixel on the first mapped focal plane of the second plurality of focal planes.

14. The system of claim 11, wherein the control circuitry is further configured to:
    identify a fifth pixel of the first focal plane of the first plurality of focal planes that has a luminance value that is greater than zero;
    determine that a luminance value of a corresponding sixth pixel in the second focal plane of the first plurality of focal planes is equal to zero;
    in response to the determining that the luminance value of the sixth pixel is equal to zero, store the luminance value for the fifth pixel as a luminance value of a fifth mapped pixel on the second mapped focal plane of the second plurality of focal planes.

15. The system of claim 11, wherein the near-eye device using the pixel location data to cause formation of a three-dimensional image comprises:
    adjusting, by a spatial light modulator, a wavelength of light produced by the display of the second plurality of focal planes based on a phase function determined based on the pixel location data.

16. The system of claim 10, wherein the control circuitry is further configured to:
    identify a pixel location that has a luminance value that is greater than zero in a highest number of the first plurality of focal planes;
    determine that a number of the first plurality of focal planes in which the pixel location has a luminance value that is greater than zero is at least one less than a total number of the first plurality of focal planes and, in response, select the number as a number of the second plurality of focal planes to which the first plurality of focal planes are to be mapped.

17. The system of claim 10, wherein the near-eye display displays the second plurality of focal planes by simultaneously displaying the second plurality of focal planes in different locations of a display.

18. The system of claim 10, wherein the near-eye display displays the second plurality of focal planes by shifting between displaying different focal planes of the second plurality of focal planes on a display.

* * * * *